(12) United States Patent
Murray et al.

(10) Patent No.: US 7,840,655 B2
(45) Date of Patent: Nov. 23, 2010

(54) ADDRESS RESOLUTION PROTOCOL CHANGE ENABLING LOAD-BALANCING FOR TCP-DCR IMPLEMENTATIONS

(75) Inventors: Elizabeth Jean Murray, Austin, TX (US); Vasu Vallabhaneni, Austin, TX (US); Venkat Venkatsubra, Austin, TX (US); Patrick Tam Vo, Houston, TX (US)

(73) Assignee: International Business Machines Corporation, Armonk, NY (US)

( * ) Notice: Subject to any disclaimer, the term of this patent is extended or adjusted under 35 U.S.C. 154(b) by 145 days.

(21) Appl. No.: 11/940,133

(22) Filed: Nov. 14, 2007

(65) Prior Publication Data

US 2009/0125615 A1    May 14, 2009

(51) Int. Cl.
*G06F 15/16* (2006.01)
(52) U.S. Cl. ...................... 709/221; 709/200
(58) Field of Classification Search ............... 709/219, 709/200–202, 221, 224
See application file for complete search history.

(56) References Cited

U.S. PATENT DOCUMENTS

| 2002/0191562 | A1* | 12/2002 | Kumaki et al. ............... 370/331 |
| 2003/0236852 | A1  | 12/2003 | Fernandes et al. |
| 2005/0165932 | A1  | 7/2005  | Banerjee et al. |
| 2005/0180439 | A1* | 8/2005  | Kondo et al. ................. 370/401 |
| 2005/0195851 | A1  | 9/2005  | Banerjee et al. |
| 2006/0015635 | A1  | 1/2006  | Fernandes et al. |
| 2006/0274752 | A1  | 12/2006 | Jain et al. |

\* cited by examiner

*Primary Examiner*—Moustafa M Meky
(74) *Attorney, Agent, or Firm*—Yee & Associates, P.C.; David A. Mims, Jr.

(57) ABSTRACT

Data processing systems, computer implemented methods, and computer program products are provided for updating an address resolution protocol table. Updates received for the address resolution protocol table are comprised of an internet protocol address, a media access control address, and a unique identifier.

14 Claims, 5 Drawing Sheets

FIG. 4

| | MAC ADDRESS | | IP ADDRESS | | UNIQUE IDENTIFIER |
|---|---|---|---|---|---|
| 422 | 00-08-74-4C-7F-1D | 432 | 192.151.021.251 | 442 | 10:24:36 |
| 424 | 00-08-74-4C-7F-1D | 434 | 192.151.021.732 | 444 | 10:24:36 |
| 426 | 00-08-79-4C-7F-1D | 436 | 192.151.021.646 | 446 | 10:24:36 |
| 428 | 00-A7-12-55-16-E1 | 438 | 180.654.121.617 | 448 | 10:24:36 |
| 430 | 00-A7-12-55-16-E1 | 440 | 180.654.121.184 | 450 | 10:24:36 |

414

| 454 | |
|---|---|
| 456 | 00-A7-12-55-16-E1 |
| 458 | 180.654.121.200 |
| 460 | 10:24:46 |

FIG. 5

| | MAC ADDRESS | | IP ADDRESS | | UNIQUE IDENTIFIER |
|---|---|---|---|---|---|
| 522 | 00-08-74-4C-7F-1D | 532 | 192.151.021.251 | 542 | 10:24:36 |
| 524 | 00-08-74-4C-7F-1D | 534 | 192.151.021.752 | 544 | 10:24:36 |
| 526 | 00-08-79-4C-7F-1D | 536 | 192.151.021.646 | 546 | 10:24:36 |
| 528 | 00-A7-12-55-16-E1 | 538 | 180.654.121.617 | 548 | 10:24:36 |
| 530 | 00-A7-12-55-16-E1 | 540 | 180.654.121.184 | 550 | 10:24:36 |

514

| 554 | |
|---|---|
| 556 | 00-A7-12-55-16-E1 |
| 558 | 180.654.121.184 |
| 560 | 10:24:36 |

FIG. 6

| MAC ADDRESS | | IP ADDRESS | | UNIQUE IDENTIFIER | |
|---|---|---|---|---|---|
| 622 | 00-08-74-4C-7F-ID | 632 | 192.151.021.251 | 642 | 10:24:66 |
| 624 | 00-08-74-4C-7F-ID | 634 | 192.151.021.762 | 644 | 10:24:66 |
| 626 | 00-08-79-4C-7F-ID | 636 | 192.151.021.646 | 646 | 10:24:66 |
| 628 | 00-A7-12-55-16-E1 | 638 | 180.654.121.617 | 648 | 10:24:66 |
| 630 | 00-A7-12-55-16-E1 | 640 | 180.654.121.184 | 650 | 10:24:66 |

614

| 654 | 656 | 00-A7-12-55-16-E1 |
|---|---|---|
| | 658 | 180.654.121.184 |
| | 660 | 10:27:21 |

FIG. 7

| MAC ADDRESS | | IP ADDRESS | | UNIQUE IDENTIFIER | |
|---|---|---|---|---|---|
| 756 | 00.A7.12.55.1G.E1 | 758 | 180.654.121.184 | 760 | 10:27:21 |

714

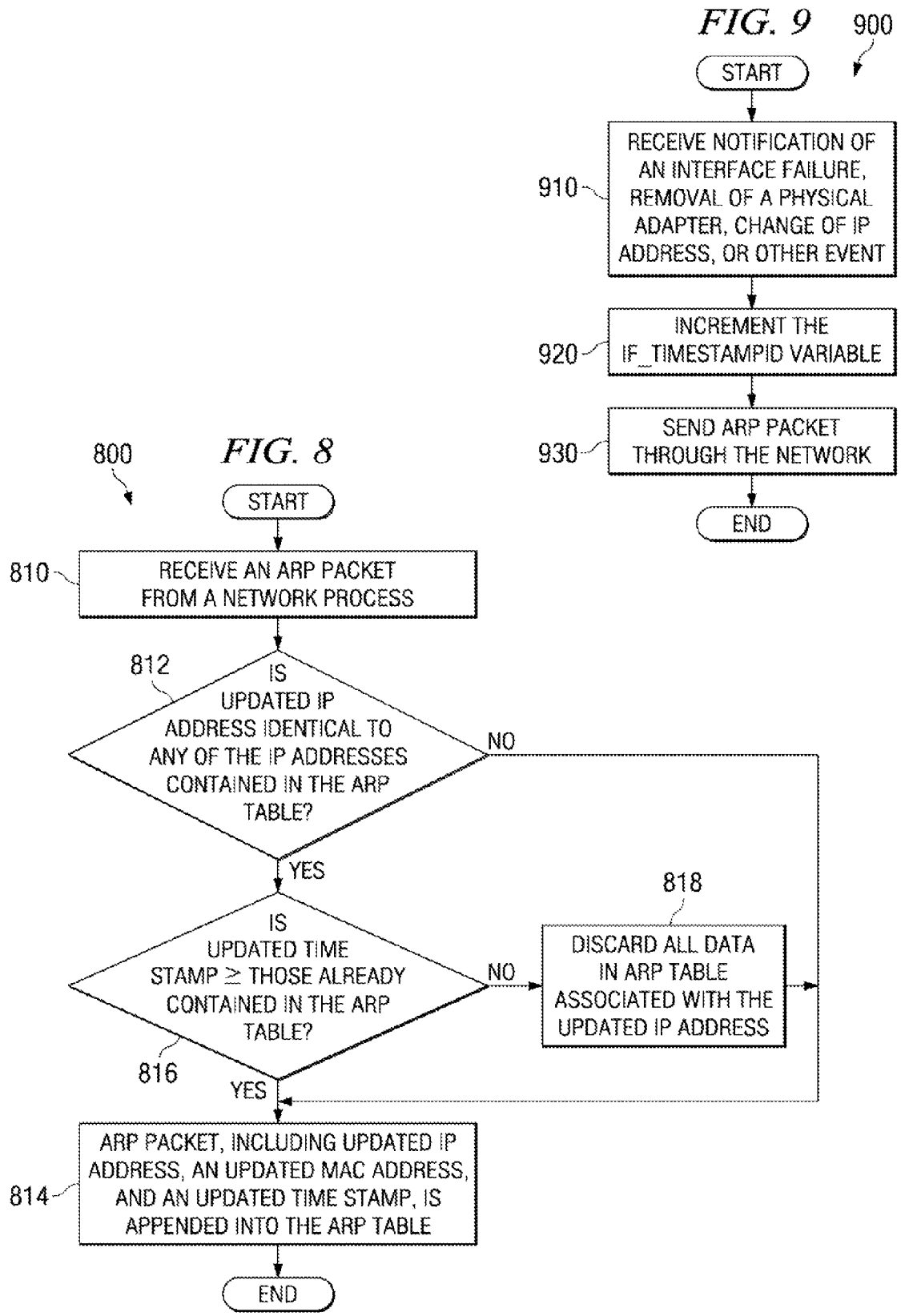

ADDRESS RESOLUTION PROTOCOL CHANGE ENABLING LOAD-BALANCING FOR TCP-DCR IMPLEMENTATIONS

BACKGROUND OF THE INVENTION

1. Field of the Invention

The present invention relates generally to systems, methods and computer program product code for data processing systems. More specifically, the present invention relates to systems, methods, and computer program product code for updating internet protocol and media access control addresses within an address resolution protocol table.

2. Description of the Related Art

An Internet Protocol (IP) address is a unique address that allows electronic devices to identify and communicate with each other over the network layer of a computer network. Communications typically utilize the Internet Protocol standard. A unique Internet Protocol address can be assigned to any network device.

The network, layer is responsible for end-to-end (source-to-destination) packet delivery. The network layer is called Internet layer in a Transmission Control Protocol/Internet Protocol reference model. The network layer performs network routing, flow control, network segmentation/desegmentation, and error control functions.

Media Access Control addresses, sometimes referred to as hardware addresses or adapter addresses, are unique identifiers attached to most network adapters allowing the network adapters to identify and communicate with each other over a data link layer of a computer-network. A Media Access Control address is a number that acts like a name for a particular network adapter, so, for example, the network cards (or built-in network adapters) in two different computers will have different names, or Media Access Control addresses, as would an Ethernet adapter and a wireless adapter in the same computer, and as would multiple network cards in a router.

The data link layer is the layer which transfers data between, adjacent network nodes in a wide area network or between nodes on the same local area network segment. That is, the data link layer is responsible for node-to-node or hop-to-hop packet delivery. The data, link layer provides the functional and procedural means to transfer data between network entities. Examples of data link protocols are Ethernet for local area networks and point-to-point protocol, high level data link control and Serial Advanced Technology Attachment (SATA) communication control protocol for point-to-point connection.

Media Access Control addresses, unlike Internet Protocol addresses, are not divided into "device" and "network" portions, so a host cannot determine, from the Media Access Control address of another host, whether that host is on the same network segment as the sending host.

Address Resolution Protocol (ARP) is commonly used to convert from network layer addresses in an Internet Protocol to the data link layer Media Access Control address. Address Resolution Protocol (ARP) tables map Internet Protocol addresses to Media Access Control addresses. ARP tables are updated through network packets which have been formatted according to the ARP protocol. ARP packets contain only two essential pieces of information: an Internet Protocol address and a Media Access Control address.

Address Resolution Protocol (ARP) tables are updated through network packets which have been formatted according to the Address Resolution Protocol protocol. Address Resolution Protocol tables contain entries that are unique with respect to Internet Protocol address, that is, no two entries in the Address Resolution Protocol table correspond to the same Internet Protocol address. This unique Internet Protocol address implementation ensures that entries in the Address Resolution Protocol table are unique by immediately replacing any existing Internet Protocol entry upon receiving a new entry having an identical Internet Protocol address. Because there can be at most one Address Resolution Protocol table entry per Internet Protocol address, then the most recent update packet received is necessarily the most recent Media Access Control address for the Internet Protocol address.

SUMMARY OF THE INVENTION

Data processing systems, computer implemented methods, and computer program products are provided for updating an address resolution protocol table. Updates received for the address resolution protocol table are comprised of an internet protocol, address, a media access control address, and a unique identifier.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 4 is a further diagram of the flow of data through a network is depicted in accordance with illustrative embodiments;

FIG. 5 is a further diagram of the flow of data through a network is depicted in accordance with illustrative embodiments;

FIG. 6 is a further diagram of the flow of data through a network is depicted in accordance with illustrative embodiments;

FIG. 7 is a further diagram of the flow of data through a network is depicted in accordance with illustrative embodiments;

FIG. 8 is a flowchart showing the process steps for receiving an Address Resolution Protocol update and updating a client Address Resolution Protocol table is shown in accordance with illustrative embodiments; and FIG. 9 is a flowchart showing the process steps for sending an Address Resolution Protocol update and updating a server Address Resolution Protocol table in accordance with illustrative embodiments.

DETAILED DESCRIPTION OF THE PREFERRED EMBODIMENT

Figure 1:
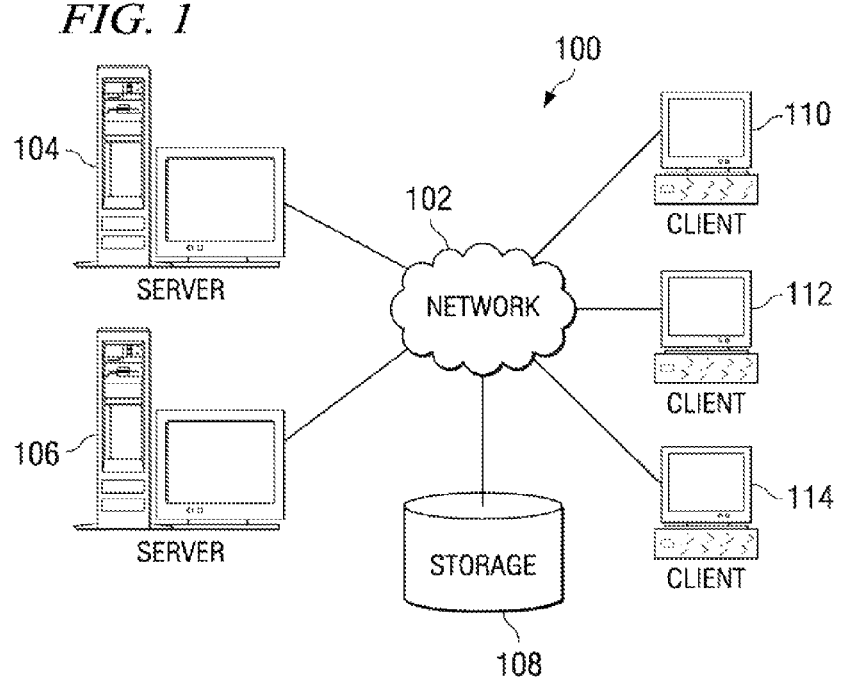
FIG. 1 depicts a pictorial representation of a network of data processing systems in which illustrative embodiments may be implemented.
Figure 2:
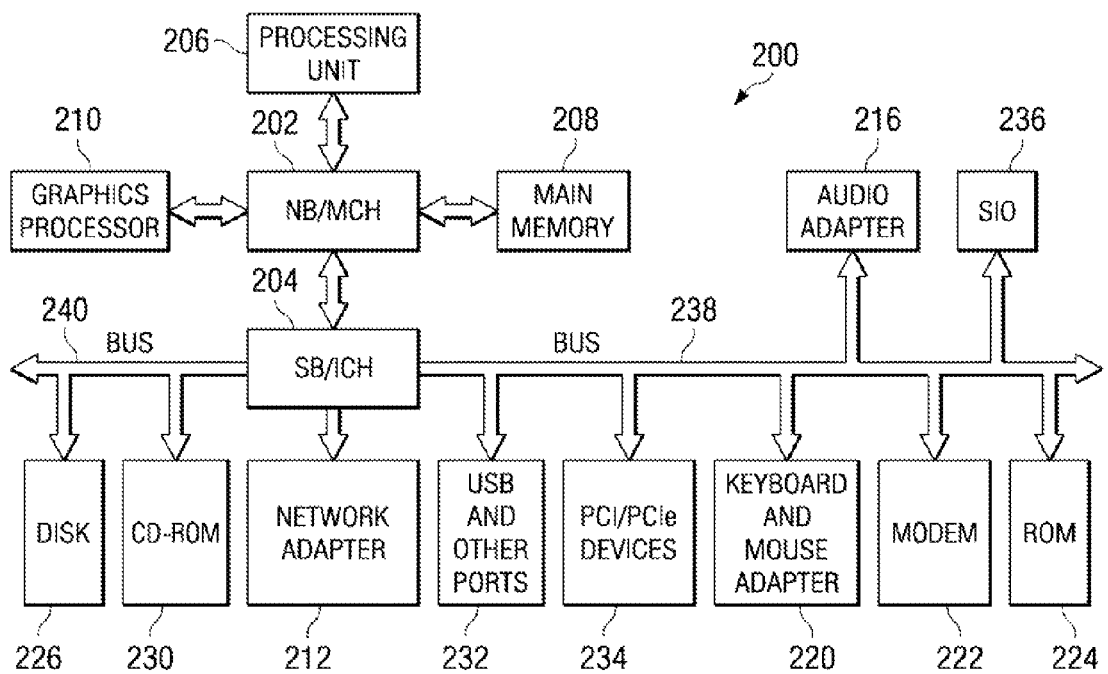
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (Transmission Control Protocol/Internet Protocol) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments.

In the depicted example, data processing system 200 employs a hub architecture including interface and memory controller hub (interface/MCH) 202 and interface and input/output (I/O) controller hub (interface/ICH) 204, Processing unit 206, main memory 208, and graphics processor 210 are coupled to interface and memory controller hub 202. Processing unit 206 may contain one or more processors and even may be implemented using one or more heterogeneous processor systems. Graphics processor 210 may be coupled to the interface/MCH through an accelerated graphics port (AGP), for example.

In the depicted example, local area network (LAN) adapter 212 is coupled to interface and I/O controller hub 204 and audio adapter 216, keyboard and mouse adapter 220, modem 222, read only memory (ROM) 224, universal serial bus (USB) and other ports 232, and PCI/PCIe devices 234 are coupled to interface and I/O controller hub 204 through bus 238, and hard disk drive (HDD) 226 and CD-ROM 230 are coupled to interface and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to interface and I/O controller hub 204.

An operating system runs on processing unit 206 and coordinates and provides control of various components within data processing system 200 in FIG. 2. The operating system may be a commercially available operating system such as Microsoft® Windows Vista™ (Microsoft and Windows Vista are trademarks of Microsoft Corporation in the United States, other countries, or both). An object oriented programming system, such as the Java™ programming system, may run in conjunction with the operating system and provides calls to the operating system from Java™ programs or applications executing on data processing system 200. Java™ and all Java™-based trademarks are trademarks of Sun Microsystems, Inc. in the United States, other countries, or both.

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in interface and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

Prior art solutions ensured that entries in the Address Resolution Protocol table were unique by immediately replacing any current Address Resolution Protocol entry if a new Address Resolution Protocol packet were received. However, because there could be at most one entry per Internet Protocol address, the most recently received Address Resolution Protocol packet was necessarily the Media Access Control address assigned to associated Internet Protocol address. However, if an Internet Protocol address may be associated with more than one Media Access Control address, and because a computer receives at most one update at a time, then several updates could be correct even though they are necessarily received in some arbitrary order.

By adding a unique identifier to each Address Resolution Protocol packet, the presently described embodiments become capable of providing load balancing for incoming transmission control protocol (Transmission Control Protocol) connections on a per-packet or per-connection basis. Unique identifiers appended to each Address Resolution Protocol packet also enable the use of Transmission Control Protocol delayed congestion response (DCR) or duplicate selective acknowledgment (DSACK) to create ether channel-like capabilities without special hardware setups.

Because each separate entry in the Address Resolution Protocol table may have identical Internet Protocol addresses and different unique identifiers, the presently described embodiments allow more than one Address Resolution Protocol table entry to be associated with a single Media Access Control address. Furthermore, by adding a unique identifier to the Address Resolution Protocol, an Internet Protocol address may be associated with more than one Media Access Control address, Address Resolution Protocol packets received in an arbitrary order can still be incorporated into the Address Resolution Protocol table.

Figure 3:
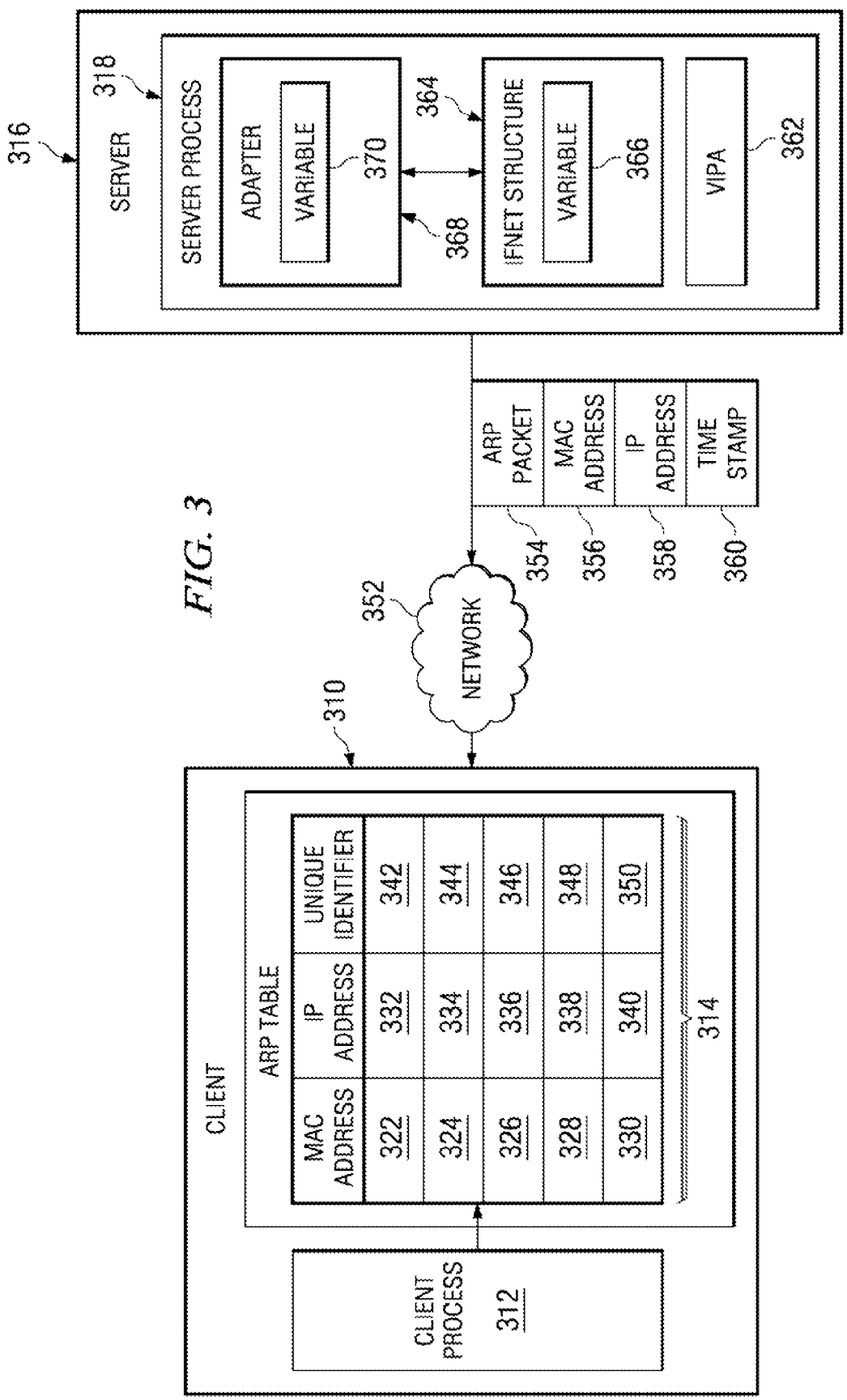
FIG. 3 is a diagram of the flow of data through a network is depicted in accordance with illustrative embodiments.

Referring now to FIG. 3, a diagram of the flow of data through a network is depicted in accordance with illustrative embodiments. Client 310 can be a client on a network, such as clients 110, 112, and 114 of FIG. 1. Client 310 runs client process 312 to update Address Resolution Protocol table 314. Server 316 is a server on a network, such as server 104 and 106 of FIG. 1. Server 316 runs server process 318 to update Address Resolution Protocol table 314 of client 310.

Address Resolution Protocol table 314 is a data structure mapping Internet Protocol addresses with an associated Media Access Control address for various network devices. Address Resolution Protocol table 314 contains Media Access Control addresses 322-330, Internet Protocol addresses 332-340, and unique identifiers 342-350. Media Access Control addresses 322-330 are identification numbers that act as names for a particular associated network adapter. For example, the network cards (or built-in network adapters) in two different computers will, have different names, or Media Access Control addresses, as would an Ethernet adapter and a wireless adapter in the same computer, and as would multiple network cards in a router. Internet Protocol addresses 332-340 are unique identification addresses that allow electronic devices, such as client 310, to identify and communicate with each other over the network layer of a computer network, such as network 352.

Address Resolution Protocol, table 314 also includes unique identifiers 342-350. Unique identifiers 342-350 may, but does not have to, be a literal timestamp. Rather, each of unique identifiers 342-350 is an identifier which is common to an entire set of Address Resolution Protocol table updates. Unique identifiers 342-350 can be a literal time stamp, regardless of format, an incremented counter, or any other sequentially based identifier. By adding unique identifiers 342-350, Address Resolution Protocol table 314 could contain an unlimited number of entries for the same Internet Protocol address, as long as each of the entered Internet Protocol addresses have a different unique identifier 342-350.

By adding a unique identifier 342-350 to each Address Resolution Protocol packet 354, the server 316 becomes capable of providing load balancing for incoming transmission control protocol (Transmission Control Protocol) connections on a per-packet or per-connection basis. Unique identifiers 342-350 appended to each Address Resolution Protocol packet 354 also enable the use of Transmission Control Protocol—delayed congestion response (DCR) or duplicate selective acknowledgment (DSACK) to create ether channel-like capabilities without special hardware setups.

Because each separate entry in the Address Resolution Protocol table may have identical Internet Protocol addresses and different unique identifiers, more than one Address Resolution Protocol, table entry may be associated with a single Media Access Control address. Furthermore, because a computer receives at most one update at a time, several updates, i.e., Address Resolution Protocol packets, could be correct even though they are necessarily received in some arbitrary order.

Client process 312 receives Address Resolution Protocol packet 354 from network process 318. Address Resolution Protocol packet 354 contains an updated Internet Protocol address 356, an updated Media Access Control address 358, and an updated unique identifier 360.

Client process 312 first examines updated Internet. Protocol address 356 and compares it to Internet Protocol addresses 332-340 contained in Address Resolution Protocol table 314. If updated Internet Protocol address 356 does not already appear in Address Resolution Protocol table 314, Address Resolution Protocol packet 354, including updated Internet Protocol address 356, an updated Media Access Control address 358, and an updated unique identifier 360, is simply appended to Address Resolution Protocol table 314. That is, if updated Internet Protocol address 356 is not identical to one of Internet Protocol addresses 332-340, information in the Address Resolution Protocol packet 354 is appended to Address Resolution Protocol table 314. An updated Address Resolution Protocol table 314 including Address Resolution Protocol packet 454B is depicted in FIG. 4.

FIG. 4 is a further diagram of the flow of data through a network is depicted in accordance with illustrative embodiments. As shown in FIG. 4, updated Internet Protocol address 458 is unique when compared to each of Internet Protocol addresses 432-440. Address Resolution Protocol table 414 has therefore been updated to include updated Internet Protocol address 458, an updated Media Access Control address 456, and an updated unique identifier 460 contained in Address Resolution Protocol packet 454.

Now referring back to FIG. 3, upon examining updated Internet Protocol address 356 and comparing it to Internet Protocol addresses 332-340 contained in Address Resolution Protocol table 314, if updated Internet Protocol address 356 already appears in Address Resolution Protocol table 314, client process 312 next examines updated unique identifier 360 and compares it to unique identifiers 342-350 contained in Address Resolution Protocol table 314. If updated unique identifier 360 is identical to unique identifiers 342-350, Address Resolution Protocol packet 354, including updated Internet Protocol address 356, an updated Media Access Control address 358, and an updated unique identifier 360, is simply appended to Address Resolution Protocol table 314. That is, if updated Internet. Protocol address 356 is identical to one of Internet Protocol addresses 332-340, and unique identifier 360 is identical to other unique identifiers 342-350, information in the Address Resolution Protocol packet 354 is appended to Address Resolution Protocol table 314. An updated Address Resolution Protocol table 314 including Address Resolution Protocol packet 554 is depicted in FIG. 5.

FIG. 5 is a further diagram of the flow of data through a network is depicted in accordance with illustrative embodiments. As shown in FIG. 5, updated Internet Protocol address 558 is identical to Internet Protocol address 540. Likewise, updated unique identifier 560 is identical to unique identifiers 542-550. Address Resolution Protocol table 514 has therefore been updated to include updated Internet. Protocol address 556, an updated Media Access Control address 558, and an updated unique identifier 560 contained in Address Resolution Protocol packet 554. While unique identifier 560 is shown as a literal time stamp having an "hours:minutes:seconds" format, other formats can be utilized. Unique identifier 560 may utilize a daily, weekly, or monthly update. Furthermore, unique identifier 560 need not be a literal time stamp. Unique identifier 560 may be any sequential or pattern based identifier, such as a counter, that, can be utilized to determine the relative chronology of Address Resolution Protocol packet 554 received at Address Resolution Protocol table 514.

Now referring back to FIG. 3, upon examining updated unique identifier 360 and comparing it to unique identifiers 342-350 contained in Address Resolution Protocol table 314, if updated unique identifier 360 is not identical to unique identifiers 342-350, data in Address Resolution Protocol table 314, all of data in Address Resolution Protocol, table 314 is discarded. Address Resolution Protocol packet 354, including updated Internet Protocol address 356, an updated Media Access Control address 358, and an updated unique identifier 360, is then appended into Address Resolution Protocol table 314.

FIG. 6 is a further diagram of the flow of data through a network is depicted in accordance with illustrative embodiments. This situation is shown in FIGS. 6 and 7. As shown in FIG. 6, updated Internet Protocol address 656 is identical to Internet Protocol address 638. However, updated unique identifier 660 is different from unique identifiers 642-650. The data in Address Resolution Protocol table 614 is therefore discarded, and Address Resolution Protocol packet 654, including updated Internet Protocol address 656, an updated Media Access Control address 658, and an updated unique identifier 660, is then appended into Address Resolution Protocol table 614.

FIG. 7 is a further diagram of the flow of data through a network is depicted in accordance with illustrative embodiments. As shown in FIG. 7, Address Resolution Protocol table 714 has been updated to include updated Internet Protocol address 756, an updated Media Access Control address 758, and an updated unique identifier 760 contained in Address Resolution Protocol packet 754. Previous data from Address Resolution Protocol table 714 has been removed.

Prior art solutions ensured that entries in the Address Resolution Protocol table were unique by immediately replacing any current Address Resolution Protocol entry if a new Address Resolution Protocol packet were received. However, because there could be at most one entry per Internet Protocol address, the most recently received Address Resolution Protocol packet was necessarily the Media Access Control address assigned to associated Internet Protocol address. However, if an Internet Protocol address may be associated with more than one Media Access Control address, and because a computer receives at most one update at a time, then several updates could be correct even though they are necessarily received in some arbitrary order.

Referring now again to FIG. 3, server 316 is a server on a network, such as server 102 of FIG. 1. Server 316 runs server process 318 to update Address Resolution Protocol table 314 of client 310. While the implementation described herein is for a BSD-style Transmission Control Protocol/Internet Protocol stack, other implementations can foe utilized.

Server 316 is assigned virtual internet Protocol address (Virtual Internet Protocol Address) 362. A corresponding ifnet structure 364 is also stored on server 316. Ifnet structure 364 contains a variable 366, such as variable if_timestampID. Ifnet structure 364 is referenced by adapter 368 assigned to Virtual Internet Protocol Address 362. Adapter 368 can be a plurality of adapters, however, for simplicity, only one adapter 368 is shown.

Adapter 368 can accept or transmit data for Virtual Internet Protocol Address 362. Adapter 368 contains a variable 370, such as variable ifvipaxface, which references ifnet structure 364. For consistency purposes and ease of implementation throughout server 316, all ifnet structures within server 316 could contain variables identical to variable 366. However, in the case of a non-Virtual Internet Protocol Address ifnet structure, the value of the associated variable would never change.

In the event, of interface failure, removal of a physical adapter, change of Internet Protocol address, or other event, server process 318 increments the value of variable 366. Server process 318 then sends Address Resolution Protocol packet 354 through the network to client 310. Address Resolution Protocol packet 354 contains an updated. Internet Protocol address 356, an updated Media Access Control address 358, and an updated unique identifier 360. Updated unique identifier is, or is calculate from, variable 366.

The structure of Address Resolution Protocol packet 354 is modified to contain the additional, times tamp 360 variable field. This field is appended to the end of Address Resolution Protocol packet 354. When responding to Address Resolution Protocol requests for the Virtual Internet Protocol Address, the server machine adds the value of timestamp 360 to the Address Resolution Protocol response or update, and sends Address Resolution Protocol packet 354 as usual.

Referring now to FIG. 8, a flowchart showing the process steps for receiving an Address Resolution Protocol update and updating a client Address Resolution Protocol table is shown in accordance with an illustrative embodiment of the present invention. Process 800 is a software process, such as client process 312 of FIG. 3, executing on a data processing system, such as client 310 of FIG. 3.

Process 800 begins by receiving an Address Resolution Protocol packet (step 810) from a network process, such as network process 318 of FIG. 3. The Address Resolution Protocol packet contains an updated Internet Protocol address, an updated Media Access Control address, and an updated unique identifier, Responsive to receiving the Address Resolution Protocol packet, process 800 examines the updated Internet Protocol address and compares it to Internet Protocol addresses contained in an associated Address Resolution Protocol table. Process 800 determines whether the updated Internet Protocol address is identical to any of the Internet Protocol addresses contained in the Address Resolution Protocol table (step 812). If updated the updated Internet Protocol address is not identical to those Internet Protocol addresses already contained in the Address Resolution Protocol table ("no" at step 812), the Address Resolution Protocol packet, including updated Internet Protocol address, an updated Media Access Control address, and an updated unique identifier, is simply appended into the Address Resolution Protocol table (step 814), with the process terminating thereafter.

Upon examining the updated Internet Protocol address and comparing it to the Internet Protocol addresses contained in the Address Resolution Protocol table, if process 800 determines that the updated Internet Protocol address already appears in the Address Resolution Protocol table ("yes" at step 812), process 800 next examines the updated unique identifier and compares it to unique identifiers contained in the Address Resolution Protocol table. Process 800 determines whether the updated unique identifier is greater than or identical to the unique identifier associated with the identical Internet Protocol addresses contained in the Address Resolution Protocol table and the Address Resolution Protocol packet, (step 816). If the updated unique identifier is greater than or identical to those unique identifiers already contained in the Address Resolution Protocol table for that Internet Protocol address ("yes" at step 816), the Address Resolution Protocol packet, including the updated Internet Protocol address, the updated Media Access Control address, and the updated unique identifier, is simply appended into the Address Resolution Protocol table (step 814), with the process terminating thereafter. That is, if the updated Internet Protocol address is identical to one of Internet Protocol addresses in the Address Resolution Protocol table, and the updated unique identifier is identical to other unique identifiers for that Internet Protocol address, information in the Address Resolution Protocol packet is appended, to Address Resolution Protocol table.

Upon examining the updated unique identifier and comparing it to the unique identifiers contained in the Address Resolution Protocol table, if the updated unique identifier is not greater than or identical to the unique identifiers associated with the updated Internet Protocol address in the Address Resolution Protocol table ("no" at step 816), all data in Address Resolution Protocol table associated with the updated Internet Protocol address is discarded (step 818), with the process returning to step 814 wherein the Address Resolution Protocol packet, including the updated Internet Protocol address, the updated Media Access Control address, and the updated unique identifier, is then appended into the Address Resolution Protocol table, with the process terminating thereafter.

Referring now to FIG. 9, a flowchart showing the process steps for sending an Address Resolution Protocol update and updating a server Address Resolution Protocol table is shown in accordance with an illustrative embodiment of the present invention. Process 900 is a software process, such as server process 318 of FIG. 3, executing on a data processing system, such as server 316 of FIG. 3. While the implementation described herein is for a BSD-style Transmission Control Protocol/Internet Protocol stack, other implementations can be utilized.

A server running process 900 is assigned a virtual Internet Protocol, address (Virtual Internet Protocol Address). A corresponding ifnet structure is also stored on the server. The ifnet structure contains a variable, such as variable if_timestampID. The ifnet structure is referenced by each adapter assigned to the Virtual Internet Protocol Address.

Each adapter can accept or transmit data for Virtual Internet Protocol Address. Each adapter contains a variable, such as variable ifvipaxface, which references the ifnet structure. For consistency purposes and ease of implementation throughout the server, all ifnet structures within the server could contain variables identical, to the if_timestampID variable. However, in the case of a non-Virtual Internet Protocol Address ifnet structure, the value of the associated if_timestampID variable would never change.

Process 900 begins by receiving a notification of an interface failure, removal of a physical adapter, change of Internet Protocol address, or other event (step 910). Responsive to receiving the notification, process 900 increments the if_timestampID variable (step 920). Process 900 then sends an Address Resolution Protocol packet through the network (step 930) to a client, such as client 310 of FIG. 3, with the process terminating thereafter. The Address Resolution Protocol packet contains an updated Internet Protocol address, an updated Media Access Control address, and an updated unique identifier. The updated unique identifier is, or is calculated from, the if_timestampID variable.

By adding a unique identifier to each Address Resolution Protocol packet, the server becomes capable of providing load balancing for incoming transmission control protocol (Transmission Control Protocol) connections on a per-packet or per-connection basis. Unique identifiers appended to each Address Resolution Protocol packet also enable the use of Transmission Control Protocol delayed congestion response (DCR) or duplicate selective acknowledgment (DSACK) to create ether channel-like capabilities without special hardware setups.

Because each separate entry in the Address Resolution Protocol table may have identical Internet Protocol addresses and different unique identifiers, more than one Address Resolution Protocol table entry may be associated with a single Media Access Control address. Furthermore, by adding a unique identifier to the Address Resolution Protocol, an Internet Protocol address may be associated with more than one Media Access Control address. Thus Address Resolution Protocol packets received in an arbitrary order can still be incorporated into the Address Resolution Protocol table.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, or transport the program for use by or in connection with the instruction execution system, apparatus, or device.

The medium can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Further, a computer storage medium may contain or store a computer readable program code such that, when the computer readable program code is executed on a computer, the execution of this computer readable program code causes the computer to transmit another computer readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers, Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited, to the particular use contemplated.

What is claimed is:

1. A computer implemented method for managing an address resolution protocol table, the method comprising:

receiving an address resolution protocol update, the update comprising a first internet protocol address, a first media access control address, and a first unique identifier, wherein the first unique identifier is an identifier common to an entire set of address resolution protocol table updates, wherein the first unique identifier is selected from the group consisting of a time stamp and a counter; and responsive to receiving the address resolution protocol update, determining whether the first internet protocol address is identical to a second internet protocol address contained within the address resolution protocol table;

responsive to determining that the first internet protocol address is identical to the second internet protocol address, determining whether the first unique identifier is identical to a second unique identifier contained within the address resolution protocol table;

updating the address resolution protocol table to include the first internet protocol address, the first media access control address, and the first unique identifier, to form an updated address resolution protocol table.

2. The computer implemented method of claim 1, the method further comprising:

routing packets according to the updated address resolution protocol table.

3. The computer implemented method of claim 1, the method further comprising:

responsive to determining that the first internet protocol address is not identical to the second internet protocol address, updating the address resolution protocol table to include the address resolution protocol update, without deleting the second internet protocol address from the address resolution protocol table.

4. The computer implemented method of claim 1, the method further comprising:

responsive to determining that the first unique identifier is identical to a second unique identifier contained within the address resolution protocol table, updating the address resolution protocol table to include the address resolution protocol update.

5. The computer implemented method of claim 1, the method further comprising:

responsive to determining that the first unique identifier is not identical to a second unique identifier contained within the address resolution protocol table, removing at least the second internet protocol address and the second unique identifier from the address resolution protocol table; and responsive to determining that the first unique identifier is not identical to a second unique identifier contained within the address resolution protocol table, updating the address resolution protocol table to include the address resolution protocol update.

6. A computer readable medium having a computer program product for managing an address resolution protocol table encoded thereon, the computer program product comprising:

computer usable program code for receiving an address resolution protocol update, the update comprising a first internet protocol address, a first media access control address, and a first unique identifier, wherein the first unique identifier is an identifier common to an entire set of address resolution protocol table updates, wherein the first unique identifier is selected from the group consisting of a time stamp and a counter;

computer usable program code for, responsive to receiving the address resolution protocol update, determining whether the first internet protocol address is identical to a second internet protocol address contained within the address resolution protocol table;

computer usable program code for, responsive to determining that the first internet protocol address is identical to the second internet protocol address, determining whether the first unique identifier is identical to a second unique identifier contained within the address resolution protocol table; and computer usable program code for updating an address resolution protocol table to include the first internet protocol address, the first media access control address, and the first unique identifier, to form an updated address resolution protocol table.

7. The computer readable medium of claim 6 further comprising:

computer usable program code for routing packets according to the updated address resolution protocol table.

8. The computer readable medium of claim 6 further comprising:

computer usable program code for, responsive to determining that the first internet protocol address is not identical to the second internet protocol address, updating the address resolution protocol table to include the address resolution protocol update.

9. The computer readable medium of claim 6, the method further comprising:

computer usable program code for, responsive to determining that the first unique identifier is identical to a second unique identifier contained within the address resolution protocol table, updating the address resolution protocol table to include the address resolution protocol update.

10. The computer readable medium of claim 6, the method further comprising:

computer usable program code for, responsive to determining that the first unique identifier is not identical to a second unique identifier contained within the address resolution protocol table, removing at least the second internet protocol address and the second unique identifier from the address resolution protocol table; and computer usable program code for, responsive to determining that the first unique identifier is not identical to a second unique identifier contained within the address resolution protocol table, updating the address resolution protocol table to include the address resolution protocol update.

11. A data processing system comprising:
a bus;
a communications unit connected to the bus;
a storage device connected to the bus, wherein the storage device includes computer usable program code; and
a processor unit connected to the bus, wherein the processor unit executes the computer usable program code to receive an address resolution protocol update, the update comprising a first internet protocol address, a first media access control address, and a first unique identifier, wherein the first unique identifier is an identifier common to an entire set of address resolution protocol table updates, wherein the first unique identifier is selected from the group consisting of a time stamp and a counter; responsive to receiving the address resolution protocol update, to determine whether the first internet protocol address is identical to a second internet protocol address contained within the address resolution protocol table; responsive to determining that the first internet protocol address is identical to the second internet protocol address, to determine whether the first unique identifier is identical to a second unique identifier contained within the address resolution protocol table; and to update an address resolution protocol table to include the first internet protocol address, the first media access control address, and the first unique identifier, to form an updated address resolution protocol table; and to route packets according to the updated address resolution protocol table.

12. The data processing system of claim 11, wherein the processor unit further executes the computer usable program code, responsive to determining that the first internet protocol address is not identical to the second internet protocol address, to update the address resolution protocol table to include the address resolution protocol update.

13. The data processing system of claim 11, wherein the processor unit further executes the computer usable program code, responsive to determining that the first unique identifier is identical to a second unique identifier contained within the address resolution protocol table, to update the address resolution protocol table to include the address resolution protocol update.

14. The data processing system of claim 11, wherein the processor unit further executes the computer usable program code, responsive to determining that the first unique identifier is not identical to a second unique identifier contained within the address resolution protocol table, to remove at least the second internet protocol address and the second unique identifier from the address resolution protocol table; and responsive to determining that the first unique identifier is not identical to a second unique identifier contained within the address resolution protocol table, to update the address resolution protocol table to include the address resolution protocol update.

* * * * *